US010154531B2

(12) United States Patent
Liao et al.

(10) Patent No.: US 10,154,531 B2
(45) Date of Patent: Dec. 11, 2018

(54) D2D LINK DISCOVERY METHOD

(71) Applicant: Huawei Technologies Co., Ltd., Shenzhen, Guangdong (CN)

(72) Inventors: Defu Liao, Hangzhou (CN); Yuqing Zhao, Hangzhou (CN); Chenglin You, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 15/332,414

(22) Filed: Oct. 24, 2016

(65) Prior Publication Data

US 2017/0041974 A1    Feb. 9, 2017

Related U.S. Application Data

(63) Continuation of application No. PCT/CN2014/076226, filed on Apr. 25, 2014.

(51) Int. Cl.
*H04W 76/14* (2018.01)
*H04B 7/06* (2006.01)
(Continued)

(52) U.S. Cl.
CPC .......... *H04W 76/14* (2018.02); *H04B 7/0452* (2013.01); *H04B 7/0617* (2013.01);
(Continued)

(58) Field of Classification Search
CPC . H04W 76/14; H04W 76/023; H04W 72/048; H04W 8/005; H04B 7/0617; H04B 7/0452; H04B 7/0456
See application file for complete search history.

(56) References Cited

U.S. PATENT DOCUMENTS 9,271,320 B2 * 2/2016 Lim .................... H04W 76/023
2010/0261469 A1 * 10/2010 Ribeiro ................. H04W 99/00
455/423
(Continued)

FOREIGN PATENT DOCUMENTS

CN    101848023 A    9/2010
CN    102088736 A    6/2011
(Continued)

OTHER PUBLICATIONS

3GPP TR 23.703 V0.4.1 (Jun. 2013), 3rd Generation Partnership Project; Technical Specification Group Services and System Aspects; Study on architecture enhancements to support Proximity Services (ProSe) (Release 12), 85 pages.
(Continued)

*Primary Examiner* — Ivan O Latorre

(57) ABSTRACT

A D2D link discovery method, which includes: obtaining, by UE, a neighboring UE list from a server, where the neighboring UE list includes related information of M neighboring UEs, and the related information is information required by the UE to determine whether a D2D connection to corresponding neighboring UE can be established by using a multiple-antenna technology; extracting, by the UE, the related information of the M neighboring UEs from the neighboring UE list, and determining N neighboring UEs from the M neighboring UEs based on the related information of the M neighboring UEs, where the N neighboring UEs are UEs to which D2D connections can be established by the UE by using the multiple-antenna technology; and performing, by the UE based on the multiple-antenna technology, link mapping between the UE and the N neighboring UEs to obtain respective links corresponding to the N neighboring UEs.

13 Claims, 3 Drawing Sheets

(51) Int. Cl.
*H04B 7/0452* (2017.01)
*H04W 8/00* (2009.01)
*H04W 72/04* (2009.01)
*H04B 7/0456* (2017.01)

(52) U.S. Cl.
CPC ......... *H04W 8/005* (2013.01); *H04W 72/048* (2013.01); *H04B 7/0456* (2013.01)

(56) References Cited

U.S. PATENT DOCUMENTS

| | | | | |
|---|---|---|---|---|
| 2012/0322484 | A1* | 12/2012 | Yu | H04W 4/08 455/509 |
| 2014/0018121 | A1* | 1/2014 | Kang | H04W 76/023 455/513 |
| 2014/0153390 | A1* | 6/2014 | Ishii | H04W 28/0289 370/230 |
| 2014/0204834 | A1* | 7/2014 | Singh | H04W 40/22 370/315 |
| 2014/0329535 | A1* | 11/2014 | Sadiq | H04W 76/14 455/452.2 |
| 2015/0223279 | A1 | 8/2015 | Jiao et al. | |

FOREIGN PATENT DOCUMENTS

| | | |
|---|---|---|
| CN | 103179669 A | 6/2013 |
| CN | 103379501 A | 10/2013 |
| CN | 103582127 A | 2/2014 |
| CN | 103686585 A | 3/2014 |

OTHER PUBLICATIONS

Wei Zhou, et al., "D2D Technology Development and Its Impact on Cellular Network Evolution," Data Commuincation, 4 pages, with English abstract.

* cited by examiner

D2D LINK DISCOVERY METHOD

CROSS-REFERENCE TO RELATED APPLICATIONS

This application is a continuation of International Application No. PCT/CN2014/076226, filed on Apr. 25, 2014, the disclosure of which is hereby incorporated by reference in its entirety.

TECHNICAL FIELD

The present invention relates to the field of wireless communications technologies, and in particular, to a D2D link discovery method.

BACKGROUND

D2D (device to device) communication is a new communications technology that allows UE (User Equipment) to perform direct communication under a condition by establishing connections with the help of control and assistance of a specific system, or by automatically establishing connections completely by UEs.

The existing D2D communication technology can be classified into the following two major categories:

a cellular D2D communication technology that includes two manners: system assistance and independent UE completion, for example, LTE-D (Long Term Evolution-Direct); and a non-cellular D2D communication technology, for example, Bluetooth, or a WiFi (Wireless Fidelity) related technology that includes WiFi Direct (Wireless Fidelity Direct), WiFi Display (Wireless Fidelity Display), or TDLS (Tunneled Direct Link Setup), and the like.

However, all D2D link discovery methods in the prior art are discovery of a single D2D link, and a technical problem of low resource utilization exists.

SUMMARY

The present invention provides a D2D link discovery method to resolve a technical problem of low resource utilization due to discovery of a single D2D link in a D2D link discovery method in the prior art.

According to a first aspect, the present invention provides a device to device D2D link discovery method, including:

obtaining, by user equipment UE, a neighboring UE list from a server, where the neighboring UE list includes related information of M neighboring UEs, the related information is information required by the UE to determine whether a D2D connection to corresponding neighboring UE can be established by using a multiple-antenna technology, and M is an integer greater than or equal to 2;

extracting, by the UE, the related information of the M neighboring UEs from the neighboring UE list, and determining N neighboring UEs from the M neighboring UEs based on the related information of the M neighboring UEs, where the N neighboring UEs are UEs to which D2D connections can be established by the UE by using the multiple-antenna technology, and N is an integer greater than or equal to 2; and performing, by the UE based on the multiple-antenna technology, link mapping between the UE and the N neighboring UEs to obtain respective links corresponding to the N neighboring UEs.

With reference to the first aspect, in a first possible implementation manner of the first aspect, the determining, by the UE, N neighboring UEs from the M neighboring UEs based on the related information of the M neighboring UEs includes:

determining, by the UE if the UE has established a D2D connection to another UE, that the other UE belongs to the N neighboring UEs, where the other UE is any UE of the M neighboring UEs.

With reference to the first possible implementation manner of the first aspect, in a second possible implementation manner of the first aspect, the method further includes:

extracting, by the UE if the UE does not establish the D2D connection to the other UE, related information of the other UE from the related information of the M neighboring UEs;

determining, by the UE based on the related information of the other UE, whether a D2D connection to the other UE can be established; and determining, by the UE if the D2D connection to the other UE can be established, that the other UE belongs to the N neighboring UEs; or determining, by the UE if the D2D connection to the other UE cannot be established, that the other UE does not belong to the N neighboring UEs.

Based on a same invention concept, according to another aspect, the present invention provides user equipment UE, including:

a memory, configured to store program code; and a processor, connected to the memory, configured to obtain the program code from the memory to perform: obtaining a neighboring UE list from a server, where the neighboring UE list includes related information of M neighboring UEs, the related information is information required by the UE to determine whether a D2D connection to corresponding neighboring UE can be established by using a multiple-antenna technology, and M is an integer greater than or equal to 2; extracting the related information of the M neighboring UEs from the neighboring UE list, and determining N neighboring UEs from the M neighboring UEs based on the related information of the M neighboring UEs, where the N neighboring UEs are UEs to which D2D connections can be established by the UE by using the multiple-antenna technology, and N is an integer greater than or equal to 2; and performing, based on the multiple-antenna technology, link mapping between the UE and the N neighboring UEs to obtain respective links corresponding to the N neighboring UEs.

With reference to the third aspect, in a first possible implementation manner of the third aspect, the processor is specifically configured to:

if the UE has established a D2D connection to another UE, determine that the other UE belongs to the N neighboring UEs, where the other UE is any UE of the M neighboring UEs.

With reference to the first possible implementation manner of the third aspect, in a second possible implementation manner of the third aspect, the processor is specifically configured to:

if the UE does not establish the D2D connection to the other UE, extract related information of the other UE from the related information of the M neighboring UEs; determine, based on the related information of the other UE, whether a D2D connection to the other UE can be established; and if the D2D connection to the other UE can be established, determine that the other UE belongs to the N neighboring UEs; or if the D2D connection to the other UE cannot be established, determine that the other UE does not belong to the N neighboring UEs.

With reference to the second possible implementation manner of the third aspect, in a third possible implementation manner of the third aspect, the processor is specifically configured to:

if the related information of the other UE includes all necessary information of a side of the other UE that is required by the UE to determine whether the D2D connection to the other UE can be established by using the multiple-antenna technology, determine, based on the related information of the other UE, whether the D2D connection to the other UE can be established by using the multiple-antenna technology; and/or if the related information of the other UE does not include all necessary information of the side of the other UE that is required by the UE to determine whether the D2D connection to the other UE can be established by using the multiple-antenna technology, obtain supplementary necessary information from the other UE by using a data connection except the D2D connection, and determine, based on the related information of the other UE and the supplementary necessary information, whether the D2D connection to the other UE can be established by using the multiple-antenna technology, where the supplementary necessary information is information obtained after the related information of the other UE is excluded from all the necessary information.

With reference to the third aspect or the foregoing possible implementation manners of the third aspect, in a fourth possible implementation manner of the third aspect, the processor is further configured to:

send, to the server, information indicating that the UE can establish D2D connections to the N neighboring UEs; and/or establish the D2D connections to the N neighboring UEs based on the respective links corresponding to the N neighboring UEs and by using the multiple-antenna technology.

With reference to the fourth possible implementation manner of the third aspect, in a fifth possible implementation manner of the third aspect, the processor is specifically configured to:

if the UE has established a D2D connection to another UE except the M neighboring UEs, adjust and/or remain the D2D connection to the other UE except the M neighboring UEs.

With reference to the third aspect or the foregoing possible implementation manners of the third aspect, in a sixth possible implementation manner of the third aspect, the related information includes:

location information, used to represent a current geological location of the corresponding neighboring UE; and/or capability information, used to represent a type of a multiple-antenna technology supported by the corresponding neighboring UE.

With reference to the third aspect or the foregoing possible implementation manners of the third aspect, in a seventh possible implementation manner of the third aspect, the multiple-antenna technology includes:

a beamforming technology; and/or a spatial multiplexing technology.

With reference to the sixth possible implementation manner of the third aspect or the seventh possible implementation manner of the third aspect, in an eighth possible implementation manner of the third aspect, the processor is specifically configured to:

extract, from related information of any UE of the N neighboring UE, capability information corresponding to the any UE; determine, based on the capability information of the any UE, a type of a multiple-antenna technology supported by the any UE; and establish a corresponding D2D connection to the any UE based on the type of the multiple-antenna technology supported by the any UE and a link corresponding to the any UE.

With reference to the eighth possible implementation manner of the third aspect, in a ninth possible implementation manner of the third aspect, the processor is specifically configured to: if the capability information of the any UE represents that the any UE supports a UE-specific reference signal, determine that the any UE supports a D2D connection that is based on a beamforming technology; and establish the D2D connection to the any UE based on the beamforming technology and the link corresponding to the any UE; and/or if the capability information of the any UE represents that the any UE supports orthogonal cover code OCC, determine that the any UE supports a D2D connection that is based on a multi-user multiple-input multiple-output MU-MIMO technology; and establish the D2D connection to the any UE based on the MU-MIMO technology and the link corresponding to the any UE.

The D2D link discovery method provided in the present invention includes: obtaining, by user equipment UE, a neighboring UE list from a server, where the neighboring UE list includes related information of M neighboring UEs, the related information is information required by the UE to determine whether a D2D connection to corresponding neighboring UE can be established by using a multiple-antenna technology, and M is an integer greater than or equal to 2; extracting, by the UE, the related information of the M neighboring UEs from the neighboring UE list, and determining N neighboring UEs from the M neighboring UEs based on the related information of the M neighboring UEs, where the N neighboring UEs are UEs to which D2D connections can be established by the UE by using the multiple-antenna technology, and N is an integer greater than or equal to 2; and performing, by the UE based on the multiple-antenna technology, link mapping between the UE and the N neighboring UEs to obtain respective links corresponding to the N neighboring UEs.

The UE extracts the related information of the M neighboring UEs from the neighboring UE list provided by the server, and performs, based on the related information of the M neighboring UEs, D2D link discovery of multiple neighboring UEs that is based on the multiple-antenna technology. Therefore, a technical problem of low resource utilization due to discovery of a single D2D link in a D2D link discovery method in the prior art is resolved effectively. In the present invention, D2D connections to multiple neighboring UEs are implemented based on the multiple-antenna technology, so that wireless resources such as frequency resources and time resources can be reused, and a technical effect of improving the resource utilization is realized.

DETAILED DESCRIPTION

Figure 1:
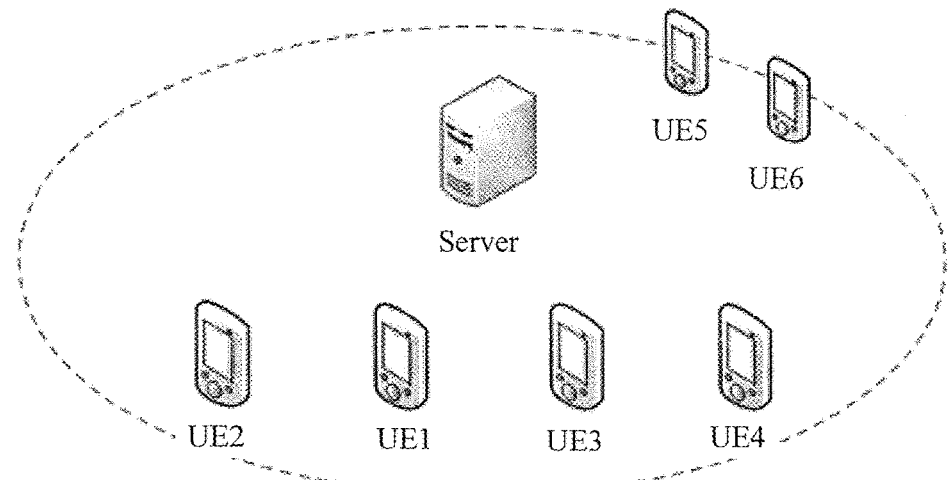
FIG. 1 is a schematic diagram of a system corresponding to a D2D link discovery method according to Embodiment 1 of the present invention.

The present invention provides a D2D link discovery method to resolve a technical problem of low resource utilization due to discovery of a single D2D link in a D2D link discovery method in the prior art.

To resolve the foregoing technical problem, a general idea of the technical solutions of the embodiments of the present invention is as follows:

A device to device D2D link discovery method includes: obtaining, by UE, a neighboring UE list from a server, where the neighboring UE list includes related information of M neighboring UEs, the related information is information required by the UE to determine whether a D2D connection to corresponding neighboring UE can be established by using a multiple-antenna technology, and M is an integer greater than or equal to 2; extracting, by the UE, the related information of the M neighboring UEs from the neighboring UE list, and determining N neighboring UEs from the M neighboring UEs based on the related information of the M neighboring UEs, where the N neighboring UEs are UEs to which D2D connections can be established by the UE by using the multiple-antenna technology, and N is an integer greater than or equal to 2; and performing, by the UE based on the multiple-antenna technology, link mapping between the UE and the N neighboring UEs to obtain respective links corresponding to the N neighboring UEs.

The UE extracts the related information of the M neighboring UEs from the neighboring UE list provided by the server, and performs, based on the related information of the M neighboring UEs, D2D link discovery of multiple neighboring UEs that is based on the multiple-antenna technology. Therefore, a technical problem of low resource utilization due to discovery of a single D2D link in a D2D link discovery method in the prior art is resolved effectively. D2D connections to multiple neighboring UEs are implemented based on the multiple-antenna technology, so that wireless resources such as frequency resources and time resources can be reused, and a technical effect of improving the resource utilization is realized.

In the present invention, by considering optimizing a D2D discovery procedure from angles such as resources and capacities, and combining a multiple-antenna technology (such as a spatial multiplexing technology or a beamforming technology), a combination of UEs that have capabilities of processing the multiple-antenna technology and support the multiple-antenna technology is considered, so that a technical effect of improving D2D link quantity, capacity and quality can be achieved with the support of D2D hardware resources.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It is first noted that the term "and/or" in this specification describes only an association relationship for describing associated objects and represents that three relationships may exist. For example, A and/or B may represent the following three cases: Only A exists, both A and B exist, and only B exists. In addition, a character "/" in this specification generally indicates that front and rear association objects are of an "or" relationship.

Before describing the embodiments of the present invention, a system corresponding to a D2D communication method in the embodiments of the present invention is first described. As shown in FIG. 1, the system includes a server and multiple UEs (such as UE1, UE2, UE3, UE4, UE5, and UE6). "UE" in this specification may be any UE of the multiple UEs.

Embodiment 1

Figure 2:
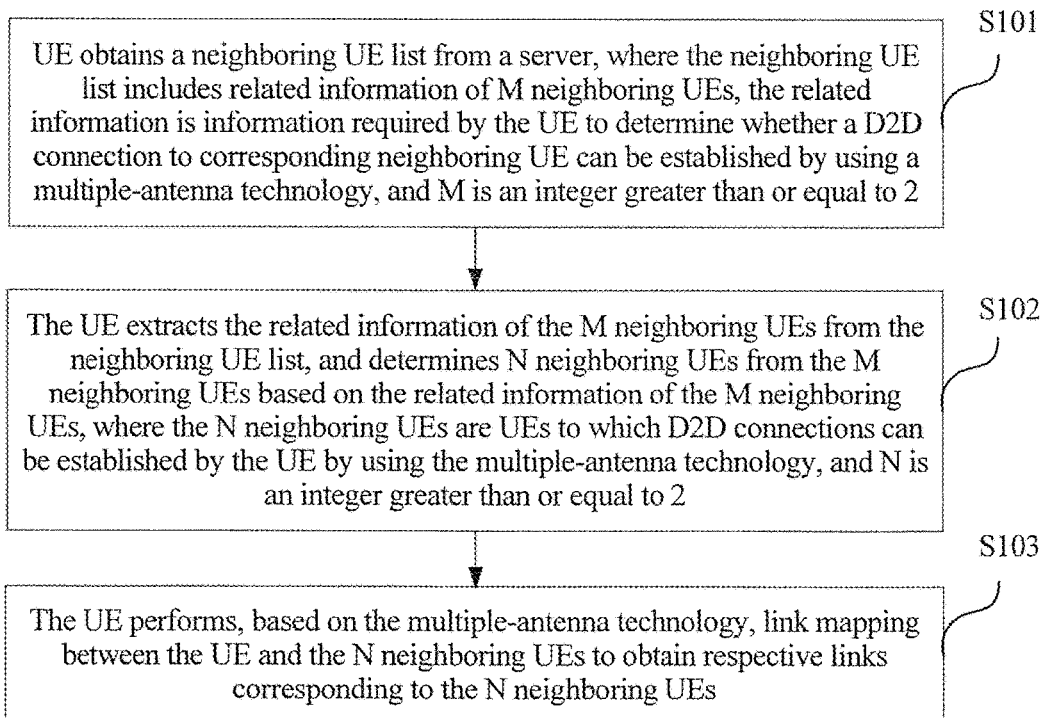
FIG. 2 is a flowchart of a D2D link discovery method according to Embodiment 1 of the present invention.

An embodiment provides a D2D link discovery method, and as shown in FIG. 2, the method includes:

Step S101: UE obtains a neighboring UE list from a server, where the neighboring UE list includes related information of M neighboring UEs, the related information is information required by the UE to determine whether a D2D connection to corresponding neighboring UE can be established by using a multiple-antenna technology, and M is an integer greater than or equal to 2.

Step S102: The UE extracts the related information of the M neighboring UEs from the neighboring UE list, and determines N neighboring UEs from the M neighboring UEs based on the related information of the M neighboring UEs, where the N neighboring UEs are UEs to which D2D connections can be established by the UE by using the multiple-antenna technology, and N is an integer greater than or equal to 2.

Step S103: The UE performs, based on the multiple-antenna technology, link mapping between the UE and the N neighboring UEs to obtain respective links corresponding to the N neighboring UEs.

For example, the UE has multiple antennas and supports the multiple-antenna technology.

For example, the UE (such as UE1) may communicate with the server in a data communication manner such as an LTE (Long Term Evolution, Long Term Evolution) network or WiFi to obtain the neighboring UE list. A distance between each of the M neighboring UEs (such as UE2 to UE6) in the neighboring UE list and the UE is less than a preset distance, and the preset distance may be a maximum distance of a D2D connection that can be established by the UE with neighboring UE by using the multiple-antenna technology.

For example, the server may periodically update the neighboring UE list, and periodically send the updated neighboring UE list to the UE. Alternatively, when the UE needs to perform data communication with neighboring UE, the server sends the (updated) neighboring UE list to the UE, so that the UE can establish a D2D data connection to the neighboring UE based on the neighboring UE list.

For example, the related information includes but is not limited to one or a combination of the following:

related identity information of the corresponding neighboring UE, for example, a related identifier and/or user identity number assigned by a network to a user;

geological location information of the corresponding neighboring UE, for example, longitude/latitude, an altitude, a moving track, and a moving trend;

a service status of the corresponding neighboring UE, for example, service distribution, an uplink/downlink service resource consumption status, a resource status of a local switching service; and capability information of the corresponding neighboring UE, for example, a quantity of antennas or whether a multiple-antenna technology such as beamforming (beamforming) or spatial multiplexing MU-MIMO (Multi-User Multiple-Input Multiple-Output, multi-user multiple-input multiple-output) is supported.

In a specific implementation process, the UE may determine the N neighboring UEs from the M neighboring UEs based on the related information of the M neighboring UEs in the neighboring UE list, and N is less than or equal to M. The N neighboring UEs are UEs to which D2D connections can be established by the UE based on the multiple-antenna technology. Specifically, the UE may configure, based on respective geological location information of the N neighboring UEs (such as longitude/latitude, an altitude, a moving track, and a moving trend of each neighboring UE), related parameters of the D2D connections that are based on the multiple-antenna technology.

The UE extracts the related information of the M neighboring UEs from the neighboring UE list provided by the server, and performs, based on the related information of the M neighboring UEs, D2D link discovery of multiple neighboring UEs that is based on the multiple-antenna technology. Therefore, a technical problem of low resource utilization due to discovery of a single D2D link in a D2D link discovery method in the prior art is resolved effectively. D2D connections to multiple neighboring UEs are implemented based on the multiple-antenna technology, so that wireless resources such as frequency resources and time resources can be reused, and a technical effect of improving the resource utilization is realized.

In this embodiment, by considering optimizing a D2D discovery procedure from angles such as resources and capacities, and combining a multiple-antenna technology (such as a spatial multiplexing technology or a beamforming technology), a combination of UEs that have capabilities of processing the multiple-antenna technology and support the multiple-antenna technology is considered, so that a technical effect of improving D2D link quantity, capacity and quality can be achieved with the support of D2D hardware resources.

Optionally, in this embodiment, when the UE has established a D2D connection to another UE, step S102 includes:

determining, by the UE, that the other UE belongs to the N neighboring UEs, where the other UE is any UE of the M neighboring UEs.

In this embodiment, when the UE has established the D2D connection to the other UE, the UE determines directly that the other UE belongs to the N neighboring UEs, and there is no need to determine, based on related information of the other UE, that the D2D connection to the other UE can be established by using the multiple-antenna technology, thereby simplifying the link discovery procedure and improving a link discovery speed in a case of multiple UEs.

Figure 3:
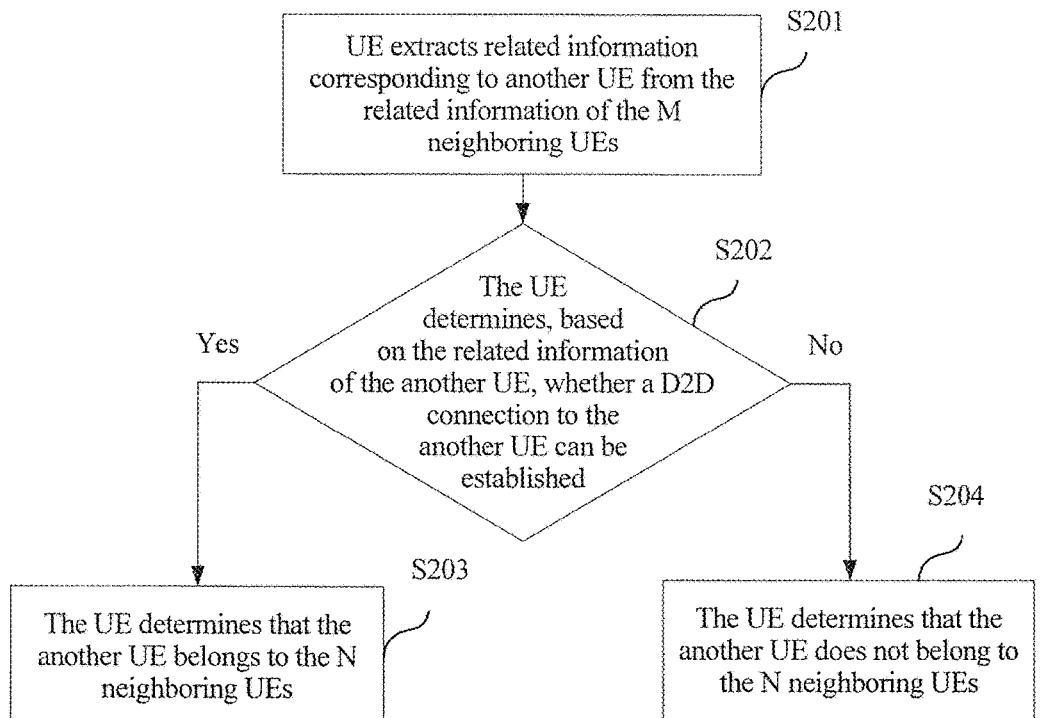
FIG. 3 is a detailed flowchart of step S102 according to Embodiment 1 of the present application.

Optionally, in this embodiment, when the UE does not establish a D2D connection to other UE, as shown in FIG. 3, step S102 includes:

Step S201: The UE extracts related information of the other UE from the related information of the M neighboring UEs.

Step S202: The UE determines, based on the related information of the other UE, whether a D2D connection to the other UE can be established.

Step S203: If the D2D connection to the other UE can be established, the UE determines that the other UE belongs to the N neighboring UEs.

Step S204: If the D2D connection to the other UE cannot be established, the UE determines that the other UE does not belong to the N neighboring UEs.

Optionally, in this embodiment, step S202 includes:

if the related information of the other UE includes all necessary information of a side of the other UE that is required by the UE to determine whether the D2D connection to the other UE can be established by using the multiple-antenna technology, determining, by the UE based on the related information of the other UE, whether the D2D connection to the other UE can be established by using the multiple-antenna technology; and/or if the related information of the other UE does not include all necessary information of the side of the other UE that is required by the UE to determine whether the D2D connection to the other UE can be established by using the multiple-antenna technology, obtaining, by the UE, supplementary necessary information from the other UE by using a data connection except the D2D connection, and determining, based on the related information of the other UE and the supplementary necessary information, whether the D2D connection to the other UE can be established by using the multiple-antenna technology, where the supplementary necessary information is information obtained after the related information of the other UE is excluded from all the necessary information.

In this embodiment, when the related information of the other UE in the neighboring UE list is not complete, the UE establishes a connection to the other UE based on another data connection manner, and obtains the supplementary necessary information from the other UE, so that the UE can successfully determine whether the D2D connection to the other UE can be established by using the multiple-antenna technology, and normal link discovery can be ensured.

Optionally, in this embodiment, after step S103, the method further includes:

sending, by the UE to the server, information indicating that the UE can establish D2D connections to the N neighboring UEs; and/or establishing, by the UE, the D2D connections to the N neighboring UEs based on the respective links corresponding to the N neighboring UEs and by using the multiple-antenna technology, to implement data communication with the N neighboring UEs.

Optionally, in this embodiment, after step S103, the method further includes:

adjusting and/or remaining, by the UE if the UE has established a D2D connection to another UE except the M neighboring UEs, the D2D connection to the other UE except the M neighboring UEs.

For example, the other UE includes:

UE to which a D2D connection is established by the UE after performing link discovery by using another link discovery method; and/or UE to which a D2D connection is established by the UE after performing link discovery based on a UE list of earlier version and before performing step S101.

In this embodiment, if the other UE is not included in the neighboring UE list but has established a D2D connection to the UE, the UE may adjust and/or remain the D2D connection to the other UE, and continue to establish D2D connections to the N neighboring UEs based on the neighboring UE list, thereby performing data communication with the other UE and the N neighboring UEs simultaneously.

Optionally, in this embodiment, the multiple-antenna technology includes:

a beamforming technology, for example, a beamforming technology; and/or a spatial multiplexing technology, for example, a MU-MIMO technology.

Optionally, in this embodiment, the establishing, by the UE based on the respective links corresponding to the N neighboring UEs, D2D connections to the N neighboring UEs by using the multiple-antenna technology includes:

extracting, by the UE from related information of any UE of the N neighboring UEs, capability information corresponding to the any UE of the N neighboring UEs;

determining, by the UE, a type of a multiple-antenna technology supported by the any UE of the N neighboring UEs based on the capability information of the any UE of the N neighboring UEs; and establishing, by the UE, a corresponding D2D connection to the any UE of the N neighboring UEs based on the type of the multiple-antenna technology supported by the any UE of the N neighboring UEs and a link corresponding to the any UE of the N neighboring UEs.

In the embodiment, the UE can determine the type of the multiple-antenna technology supported by the any UE of the N neighboring UEs based on the capability information of the any UE of the N neighboring UEs, and establish the corresponding D2D connection to the any UE of the N neighboring UEs. Therefore, in technical effect, the UE can adaptively establish a D2D connection to any UE of the N neighboring UEs, regardless of a type of a multiple-antenna technology device supported by the any UE of the N neighboring UEs.

Optionally, in this embodiment, the establishing, by the UE based on the type of the multiple-antenna technology supported by the any UE and a link corresponding to the any UE of the N neighboring UEs, a corresponding D2D connection to the any UE of the N neighboring UEs includes but is not limited to:

determining, by the UE if capability information of the any UE of the N neighboring UEs represents that the any UE of the N neighboring UEs supports a UE-specific reference signal, that the any UE of the N neighboring UEs supports a D2D connection that is based on a beamforming technology; and establishing, by the UE based on the beamforming technology and the link corresponding to the any UE of the N neighboring UEs, the D2D connection to the any UE of the N neighboring UEs; and/or determining, by the UE if capability information of the any UE of the N neighboring UEs represents that the other UE supports OCC (Orthogonal Cover Code, orthogonal cover code), that the any UE of the N neighboring UEs supports a D2D connection that is based on a MU-MIMO technology; and establishing, by the UE based on the MU-MIMO technology and the link corresponding to the any UE of the N neighboring UEs, the D2D connection to the other UE.

For example, as shown in FIG. 1 (the N neighboring UEs determined by the UE1 include the UE2, the UE3, and the UE4, and each of the UE1 to the UE4 supports beamforming or MU-MIMO):

When the UE1 performs D2D connections of multiple neighboring UEs to the UE2, the UE3, and the UE4 based on the beamforming technology, the UE1 may determine a relative position angle between the UE1 and each of the UE2, the UE3, and the UE4 according to respective corresponding geological location information of the UE2, the UE3, and the UE4, and perform D2D connection by using the beamforming technology based on the relative angles between the UE1 and the different UEs. It should be noted herein that, because a position of the UE2 relative to the UE1 is different from a position of the UE4 relative to the UE1, the UE1 may use a same resource (for example, a time-frequency resource) to establish D2D connections to the UE2 and the UE4. However, a position of the UE3 relative to the UE1 is the same as a position of the UE4 relative to the UE1, so that the UE1 needs to use different resources (such as a time-division resource or a frequency-division resource) to establish a D2D connection to either of the UE3 and the UE4.

When the UE1 establishes the D2D connections to the UE3 and the UE4 based on the MU-MIMO technology but not based on the beamforming technology, the UE1 needs to use different resources to establish a D2D connection constraint to either of the UE3 and the UE4, and the UE1 may use a same resource to establish the D2D connections to the UE3 and the UE4.

During specific implementation, the UE supports coexistence of the two types of the multiple-antenna technology. For example, the UE establishes D2D connections to some UEs by using the beamforming, and establishes D2D connections to other UEs by using the MU-MIMO.

Embodiment 2

Figure 4:
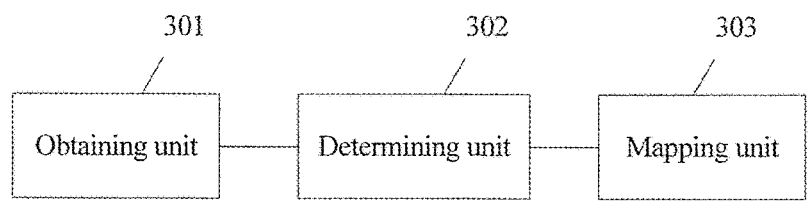
FIG. 4 is a schematic structural diagram of UE according to Embodiment 2 of the present invention.

Based on a same inventive concept, as shown in FIG. 4, an embodiment provides user equipment UE, including:

an obtaining unit 301, configured to obtain a neighboring UE list from a server, where the neighboring UE list includes related information of M neighboring UEs, the related information is information required by the UE to determine whether a D2D connection to corresponding neighboring UE can be established by using a multiple-antenna technology, and M is an integer greater than or equal to 2;

a determining unit 302, configured to receive the neighboring UE list from the obtaining unit 301, extract the related information of the M neighboring UEs from the neighboring UE list, and determine N neighboring UEs from the M neighboring UEs based on the related information of the M neighboring UEs, where the N neighboring UEs are UEs to which D2D connections can be established by the UE by using the multiple-antenna technology, and N is an integer greater than and equal to 2; and a mapping unit 303, configured to perform, based on the multiple-antenna technology, link mapping between the UE and the N neighboring UEs to obtain respective links corresponding to the N neighboring UEs.

The UE extracts the related information of the M neighboring UEs from the neighboring UE list provided by the server, and performs, based on the related information of the M neighboring UEs, D2D link discovery of multiple neighboring UEs that is based on the multiple-antenna technology. Therefore, a technical problem of low resource utilization due to discovery of a single D2D link in a D2D link discovery method in the prior art is resolved effectively. D2D connections to multiple neighboring UEs are implemented based on the multiple-antenna technology, so that wireless resources such as frequency resources and time resources can be reused, and a technical effect of improving the resource utilization is realized.

In this embodiment, by considering optimizing a D2D discovery procedure from angles such as resources and capacities, and combining a multiple-antenna technology (such as a spatial multiplexing technology or a beamforming technology), a combination of UEs that have capabilities of processing the multiple-antenna technology and support the multiple-antenna technology is considered, so that a technical effect of improving D2D link quantity, capacity and quality can be achieved with the support of D2D hardware resources.

Optionally, in this embodiment, the determining unit 302 includes:

a first determining module, configured to: if the UE has established a D2D connection to another UE, determine that the other UE belongs to the N neighboring UEs, where the other UE is any UE of the M neighboring UEs.

Optionally, in this embodiment, the determining unit 302 further includes:

a first extraction module, configured to: if the UE does not establish the D2D connection to the other UE, extract related information of the other UE from the related information of the M neighboring UEs;

a judging module, configured to determine, based on the related information of the other UE, whether the D2D connection to the other UE can be established; and a second determining module, configured to: if the D2D connection to the other UE can be established, determine that the other UE belongs to the N neighboring UEs; or if the D2D connection to the other UE cannot be established, determine that the other UE does not belong to the N neighboring UEs.

Optionally, in this embodiment, the judging module is specifically configured to:

if the related information of the other UE includes all necessary information of a side of the other UE that is required by the UE to determine whether the D2D connection to the other UE can be established by using the multiple-antenna technology, determine, based on the related information of the other UE, whether the D2D connection to the other UE can be established by using the multiple-antenna technology; and/or if the related information of the other UE does not include all necessary information of the side of the other UE that is required by the UE to determine whether the D2D connection to the other UE can be established by using the multiple-antenna technology, obtain supplementary necessary information from the other UE by using a data connection except the D2D connection, and determine, based on the related information of the other UE and the supplementary necessary information, whether the D2D connection to the other UE can be established by using the multiple-antenna technology, where the supplementary necessary information is information obtained after the related information of the other UE is excluded from all the necessary information.

Optionally, in this embodiment, the UE further includes:

a sending unit, configured to send, to the server, information indicating that the UE can establish D2D connections to the N neighboring UEs; and/or an establishment unit, configured to establish the D2D connections to the N neighboring UEs based on the respective links corresponding to the N neighboring UEs and by using the multiple-antenna technology.

Optionally, in this embodiment, the UE further includes:

an adjustment unit, configured to: if the UE has established a D2D connection to another UE except the M neighboring UEs, adjust the D2D connection to the other UE except the N neighboring UEs; and/or a remaining unit, configured to: if the UE has established a D2D connection to another UE except the M neighboring UEs, remain the D2D connection to the other UE except the M neighboring UEs.

Optionally, in this embodiment, the related information includes:

location information, used to represent a current geological location of the corresponding neighboring UE; and/or capability information, used to represent a type of a multiple-antenna technology supported by the corresponding neighboring UE.

Optionally, in this embodiment, the multiple-antenna technology includes:

a beamforming technology; and/or a spatial multiplexing technology.

Optionally, in this embodiment, the establishment unit includes:

a second extraction module, configured to extract, from related information of any UE of the N neighboring UEs, capability information corresponding to the any UE; and an establishment module, configured to determine, based on the capability information of the any UE, a type of a multiple-antenna technology supported by the any UE, and establish a corresponding D2D connection to the any UE based on the type of the multiple-antenna technology supported by the any UE and a link corresponding to the any UE.

Optionally, in this embodiment, the establishment module is specifically configured to:

if the capability information of the any UE represents that the any UE supports a UE-specific reference signal, determine that the any UE supports a D2D connection that is based on a beamforming technology; and establish the D2D connection to the any UE based on the beamforming technology and the link corresponding to the any UE; and/or if the capability information of the any UE represents that the any UE supports orthogonal cover code OCC, determine that the any UE supports a D2D connection that is based on a multi-user multiple-input multiple-output MU-MIMO technology; and establish the D2D connection to the any UE based on the MU-MIMO technology and the link corresponding to the any UE.

Embodiment 3

Figure 5:
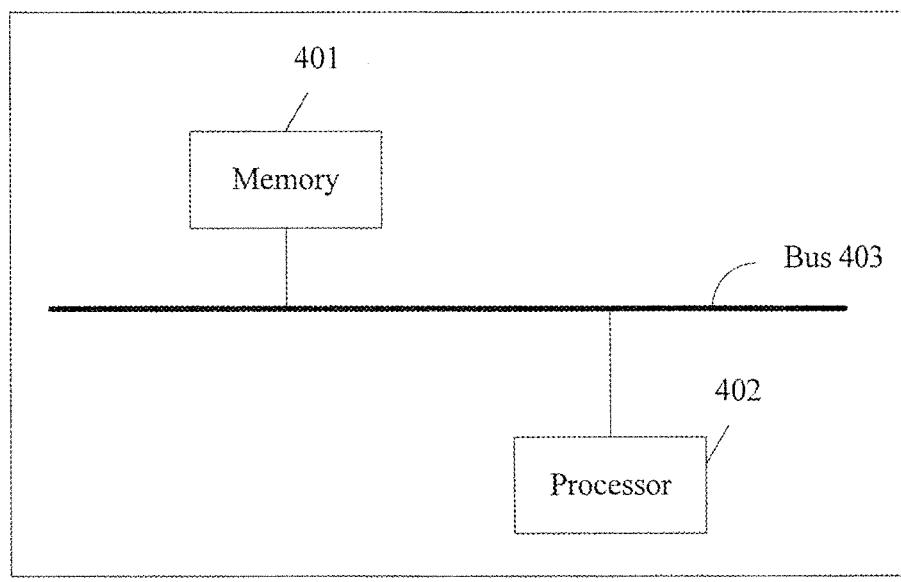
FIG. 5 is a schematic structural diagram of UE according to Embodiment 3 of the present invention.

Based on a same inventive concept, as shown in FIG. 5, an embodiment provides user equipment UE, including:

a memory 401, configured to store program code; and a processor 402, connected to the memory 401 by using a bus 403, configured to obtain the program code from the memory 401 to perform: obtaining a neighboring UE list from a server, where the neighboring UE list includes related information of M neighboring UEs, the related information is information required by the UE to determine whether a D2D connection to corresponding neighboring UE can be established by using a multiple-antenna technology, and M is an integer greater than or equal to 2; extracting the related information of the M neighboring UEs from the neighboring UE list, and determining N neighboring UEs from the M neighboring UEs based on the related information of the M neighboring UEs, where the N neighboring UEs are UEs to which D2D connections can be established by the UE by using the multiple-antenna technology, and N is an integer greater than or equal to 2; and performing, based on the multiple-antenna technology, link mapping between the UE and the N neighboring UEs to obtain respective links corresponding to the N neighboring UEs.

The UE extracts the related information of the M neighboring UEs from the neighboring UE list provided by the server, and performs, based on the related information of the M neighboring UEs, D2D link discovery of multiple neighboring UEs that is based on the multiple-antenna technology. Therefore, a technical problem of low resource utilization due to discovery of a single D2D link in a D2D link discovery method in the prior art is resolved effectively. D2D connections to multiple neighboring UEs are implemented based on the multiple-antenna technology, so that wireless resources such as frequency resources and time resources can be reused, and a technical effect of improving the resource utilization is realized.

In this embodiment, by considering optimizing a D2D discovery procedure from angles such as resources and capacities, and combining a multiple-antenna technology (such as a spatial multiplexing technology or a beamforming technology), a combination of UEs that have capabilities of processing the multiple-antenna technology and support the multiple-antenna technology is considered, so that a technical effect of improving D2D link quantity, capacity and quality can be achieved with the support of D2D hardware resources.

Optionally, in this embodiment, the processor 402 is specifically configured to:

if the UE has established a D2D connection to another UE, determine that the other UE belongs to the N neighboring UEs, where the other UE is any UE of the M neighboring UEs.

Optionally, in this embodiment, the processor 402 is specifically configured to:

if the UE does not establish the D2D connection to the other UE, extract related information of the other UE from the related information of the M neighboring UEs; determine, based on the related information of the other UE, whether a D2D connection to the other UE can be established; and if the D2D connection to the other UE can be established, determine that the other UE belongs to the N neighboring UEs; or if the D2D connection to the other UE cannot be established, determine that the other UE does not belong to the N neighboring UEs.

Optionally, in this embodiment, the processor 402 is specifically configured to:

if the related information of the other UE includes all necessary information of a side of the other UE that is required by the UE to determine whether the D2D connection to the other UE can be established by using the multiple-antenna technology, determine, based on the related information of the other UE, whether the D2D connection to the other UE can be established by using the multiple-antenna technology; and/or if the related information of the other UE does not include all necessary information of the side of the other UE that is required by the UE to determine whether the D2D connection to the other UE can be established by using the multiple-antenna technology, obtain supplementary necessary information from the other UE by using a data connection except the D2D connection, and determine, based on the related information of the other UE and the supplementary necessary information, whether the D2D connection to the other UE can be established by using the multiple-antenna technology, where the supplementary necessary information is information obtained after the related information of the other UE is excluded from all the necessary information.

Optionally, in this embodiment, the processor 402 is specifically configured to:

send, to the server, information indicating that the UE can establish D2D connections to the N neighboring UEs; and/or establish the D2D connections to the N neighboring UEs based on the respective links corresponding to the N neighboring UEs and by using the multiple-antenna technology.

Optionally, in this embodiment, the processor 402 is specifically configured to:

if the UE has established a D2D connection to another UE except the M neighboring UEs, adjust and/or remain the D2D connection to the other UE except the M neighboring UEs.

Optionally, in this embodiment, the related information includes:

location information, used to represent a current geological location of the corresponding neighboring UE; and/or capability information, used to represent a type of a multiple-antenna technology supported by the corresponding neighboring UE.

Optionally, in this embodiment, the multiple-antenna technology includes:

a beamforming technology; and/or a spatial multiplexing technology.

Optionally, in this embodiment, the processor 402 is specifically configured to:

extract, from related information of any UE of the N neighboring UE, capability information corresponding to the any UE; determine, based on the capability information of the any UE, a type of a multiple-antenna technology supported by the any UE; and establish a corresponding D2D connection to the any UE based on the type of the multiple-antenna technology supported by the any UE and a link corresponding to the any UE.

Optionally, in this embodiment, the processor 402 is specifically configured to:

if the capability information of the any UE represents that the any UE supports a UE-specific reference signal, determine that the any UE supports a D2D connection that is based on a beamforming technology; and establish the D2D connection to the any UE based on the beamforming technology and the link corresponding to the any UE; and/or if the capability information of the any UE represents that the any UE supports orthogonal cover code OCC, determine that the any UE supports a D2D connection that is based on a multi-user multiple-input multiple-output MU-MIMO technology; and establish the D2D connection to the any UE based on the MU-MIMO technology and the link corresponding to the any UE.

Although some preferred embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A device to device (D2D) link discovery method, comprising:

obtaining, by user equipment (UE), a neighboring UE list from a server, wherein the neighboring UE list comprises related information of M neighboring UEs, the related information is information required by the UE to determine whether a D2D connection to corresponding neighboring UE can be established by using a multiple-antenna technology, and M is an integer greater than or equal to 2;

extracting, by the UE, the related information of the M neighboring UEs from the neighboring UE list, and determining N neighboring UEs from the M neighboring UEs based on the related information of the M neighboring UEs, wherein the N neighboring UEs are UEs to which D2D connections can be established by the UE by using the multiple-antenna technology, and N is an integer greater than or equal to 2;

performing, by the UE based on the multiple-antenna technology, link mapping between the UE and the N neighboring UEs to obtain respective links corresponding to the N neighboring UEs;

when the UE has established a D2D connection to another UE except the M neighboring UEs, adjusting and/or continuing the D2D connection to the other UE except the M neighboring UEs;

extracting, from related information of a first UE of the N neighboring UE, capability information corresponding to the first UE;

determining, based on the capability information of the first UE, a type of a multiple-antenna technology supported by the first UE;

establishing a corresponding D2D connection to the first UE based on the type of the multiple-antenna technology supported by the first UE and a link corresponding to the first UE;

when the capability information of the first UE represents that the first UE supports a UE-specific reference signal, determining that the first UE supports a D2D connection that is based on a beamforming technology, and establishing the D2D connection to the first UE based on the beamforming technology and the link corresponding to the first UE; and/or when the capability information of the first UE represents that the first UE supports orthogonal cover code OCC, determining that the first UE supports a D2D connection that is based on a multi-user multiple-input multiple-output (MU-MIMO) technology, and establishing the D2D connection to the first UE based on the MU-MIMO technology and the link corresponding to the first UE.

2. The method according to claim 1, wherein determining, by the UE, N neighboring UEs from the M neighboring UEs based on the related information of the M neighboring UEs comprises:

determining, by the UE when the UE has established a D2D connection to another UE, that the other UE belongs to the N neighboring UEs, wherein the other UE is any UE of the M neighboring UEs.

3. The method according to claim 2, further comprising:
extracting, by the UE when the UE does not establish the D2D connection to the other UE, related information of the other UE from the related information of the M neighboring UEs;

determining, by the UE based on the related information of the other UE, whether a D2D connection to the other UE can be established; and determining, by the UE when the D2D connection to the other UE can be established, that the other UE belongs to the N neighboring UEs; or determining, by the UE when the D2D connection to the other UE cannot be established, that the other UE does not belong to the N neighboring UEs.

4. The method according to claim 3, wherein determining, by the UE based on the related information of the other UE, whether a D2D connection to the other UE can be established comprises:

when the related information of the other UE comprises all necessary information of a side of the other UE that is required by the UE to determine whether the D2D connection to the other UE can be established by using the multiple-antenna technology, determining, by the UE based on the related information of the other UE, whether the D2D connection to the other UE can be established by using the multiple-antenna technology; and/or when the related information of the other UE does not comprise all necessary information of the side of the other UE that is required by the UE to determine whether the D2D connection to the other UE can be established by using the multiple-antenna technology, obtaining, by the UE, supplementary necessary information from the other UE by using a data connection except the D2D connection, and determining, based on the related information of the other UE and the supplementary necessary information, whether the D2D connection to the other UE can be established by using the multiple-antenna technology, wherein the supplementary necessary information is information obtained after the related information of the other UE is excluded from all the necessary information.

5. The method according to of claim 1, after performing, by the UE based on the multiple-antenna technology, link mapping between the UE and the N neighboring UEs to obtain respective links corresponding to the N neighboring UEs, further comprising:

sending, by the UE to the server, information indicating that the UE can establish D2D connections to the N neighboring UEs; and/or establishing, by the UE based on the respective links corresponding to the N neighboring UEs, the D2D connections to the N neighboring UEs by using the multiple-antenna technology.

6. The method according to claim 5, further comprising:
adjusting and/or remaining, by the UE when the UE has established a D2D connection to another UE except the M neighboring UEs, the D2D connection to the other UE except the M neighboring UEs.

7. The method according to claim 1, wherein the related information comprises:

location information, used to represent a current geological location of the corresponding neighboring UE; and/or capability information, used to represent a type of a multiple-antenna technology supported by the corresponding neighboring UE.

8. User equipment (UE), comprising:
a memory, configured to store program code; and
a processor, connected to the memory, configured to obtain the program code from the memory to:
  obtain a neighboring UE list from a server, wherein the neighboring UE list comprises related information of M neighboring UEs, the related information is information required by the UE to determine whether a device-to-device (D2D) connection to corresponding neighboring UE can be established by using a multiple-antenna technology, and M is an integer greater than or equal to 2,
  extract the related information of the M neighboring UEs from the neighboring UE list,
  determine N neighboring UEs from the M neighboring UEs based on the related information of the M neighboring UEs, wherein the N neighboring UEs are UEs to which D2D connections can be established by the UE by using the multiple-antenna technology, and N is an integer greater than or equal to 2, and perform, based on the multiple-antenna technology, link mapping between the UE and the N neighboring UEs to obtain respective links corresponding to the N neighboring UEs;

when the UE has established a D2D connection to another UE except the M neighboring UEs, adjust and/or continue the D2D connection to the other UE except the M neighboring UEs;

extract, from related information of a first UE of the N neighboring UE, capability information corresponding to the first UE;

determine, based on the capability information of the first UE, a type of a multiple-antenna technology supported by the first UE;

establish a corresponding D2D connection to the first UE based on the type of the multiple-antenna technology supported by the first UE and a link corresponding to the first UE;

when the capability information of the first UE represents that the first UE supports a UE-specific reference signal, determine that the first UE supports a D2D connection that is based on a beamforming technology, and establish the D2D connection to the first UE based on the beamforming technology and the link corresponding to the first UE; and/or when the capability information of the first UE represents that the first UE supports orthogonal cover code OCC, determine that the first UE supports a D2D connection that is based on a multi-user multiple-input multiple-output (MU-MIMO) technology, and establish the D2D connection to the first UE based on the MU-MIMO technology and the link corresponding to the first UE.

9. The UE according to claim 8, wherein the processor is configured to:
when the UE has established a D2D connection to another UE, determine that the other UE belongs to the N neighboring UEs, wherein the other UE is any UE of the M neighboring UEs.

10. The UE according to claim 9, wherein the processor is configured to:
when the UE does not establish the D2D connection to the other UE, extract related information of the other UE from the related information of the M neighboring UEs;

determine, based on the related information of the other UE, whether a D2D connection to the other UE can be established; and when the D2D connection to the other UE can be established, determine that the other UE belongs to the N neighboring UEs, or when the D2D connection to the other UE cannot be established, determine that the other UE does not belong to the N neighboring UEs.

11. The UE according to claim 10, wherein the processor is configured to:
when the related information of the other UE comprises all necessary information of a side of the other UE that is required by the UE to determine whether the D2D connection to the other UE can be established by using the multiple-antenna technology, determine, based on the related information of the other UE, whether the D2D connection to the other UE can be established by using the multiple-antenna technology; and/or when the related information of the other UE does not comprise all necessary information of the side of the other UE that is required by the UE to determine whether the D2D connection to the other UE can be established by using the multiple-antenna technology, obtain supplementary necessary information from the other UE by using a data connection except the D2D connection, and determine, based on the related information of the other UE and the supplementary necessary information, whether the D2D connection to the other UE can be established by using the multiple-antenna technology, wherein the supplementary necessary information is information obtained after the related information of the other UE is excluded from all the necessary information.

12. The UE according to claim 8, wherein the related information comprises:
location information, used to represent a current geological location of the corresponding neighboring UE; and/or
capability information, used to represent a type of a multiple-antenna technology supported by the corresponding neighboring UE.

13. The UE according to claim 8, wherein the multiple-antenna technology comprises:
a beamforming technology; and/or
a spatial multiplexing technology.

* * * * *